United States Patent
Yamazaki

(10) Patent No.: US 8,640,148 B2
(45) Date of Patent: Jan. 28, 2014

(54) INFORMATION PROCESSING APPARATUS, INFORMATION PROCESSING METHOD AND STORAGE MEDIUM

(75) Inventor: Daisuke Yamazaki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

(21) Appl. No.: 12/839,728

(22) Filed: Jul. 20, 2010

(65) Prior Publication Data

US 2011/0023054 A1   Jan. 27, 2011

(30) Foreign Application Priority Data

Jul. 24, 2009   (JP) .................................. 2009-172921

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................... 719/321; 358/1.1

(58) Field of Classification Search
USPC ............................................. 719/321; 358/1
See application file for complete search history.

(56) References Cited

U.S. PATENT DOCUMENTS

| 7,065,564 | B2* | 6/2006 | Machida | 709/222 |
|---|---|---|---|---|
| 7,316,022 | B2* | 1/2008 | Nishio | 719/321 |
| 7,430,745 | B2* | 9/2008 | Kato | 719/327 |
| 2002/0156947 | A1 | 10/2002 | Nishio | |
| 2006/0033952 | A1 | 2/2006 | Oba | |
| 2006/0195495 | A1* | 8/2006 | Asano | 708/111 |
| 2012/0290694 | A9* | 11/2012 | Marl et al. | 709/223 |

FOREIGN PATENT DOCUMENTS

| CN | 1832864 | A | 9/2006 |
|---|---|---|---|
| CN | 101131627 | A | 2/2008 |
| EP | 1895400 | A2 | 3/2008 |
| JP | 11-025103 | A | 1/1999 |
| JP | 11025103 | A | 1/1999 |
| JP | 2001-337765 | A | 12/2001 |
| JP | 2004-178362 | A | 6/2004 |
| JP | 2008-052344 | A | 3/2008 |

* cited by examiner

*Primary Examiner* — Diem Cao

(74) *Attorney, Agent, or Firm* — Canon USA, Inc. IP Division

(57) ABSTRACT

A unified application acquires a printer driver, which is an example of a device driver, managed by an operating system of the information processing apparatus, and a printer object corresponding to a printer port. The printer object is an example of a device object. The unified application determines whether a function of the printer driver corresponding to the printer object satisfies a condition for registering a printer icon of the unified application.

12 Claims, 14 Drawing Sheets

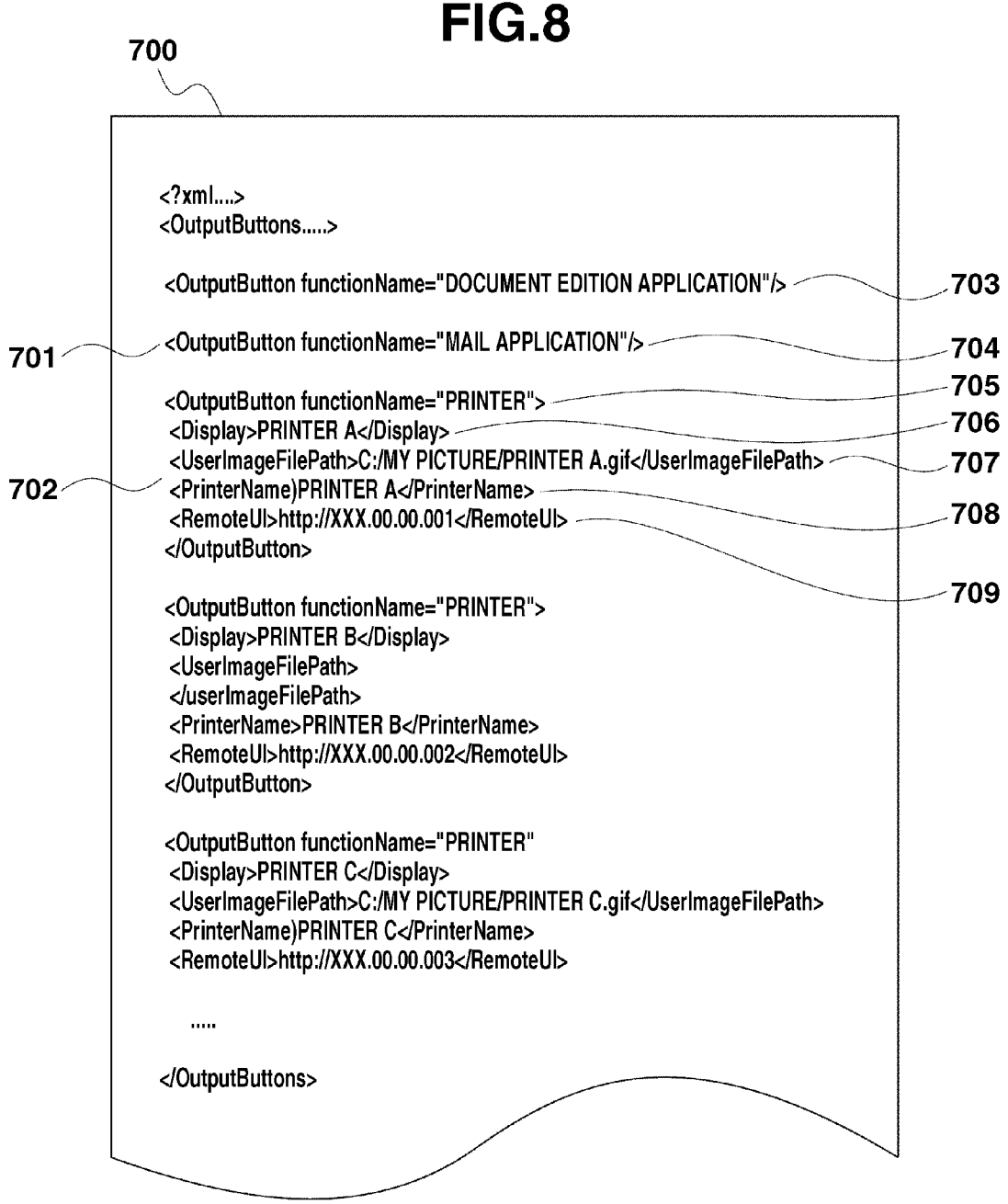

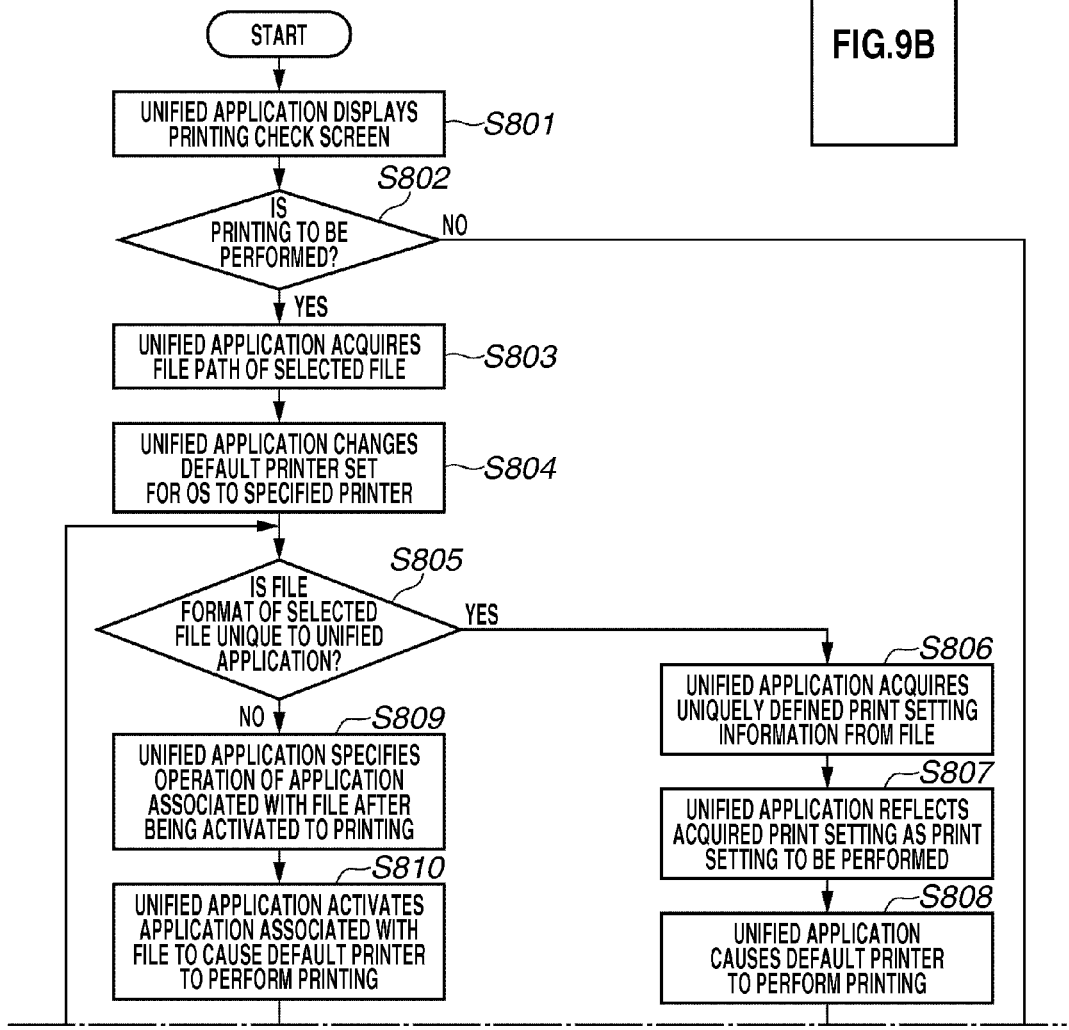

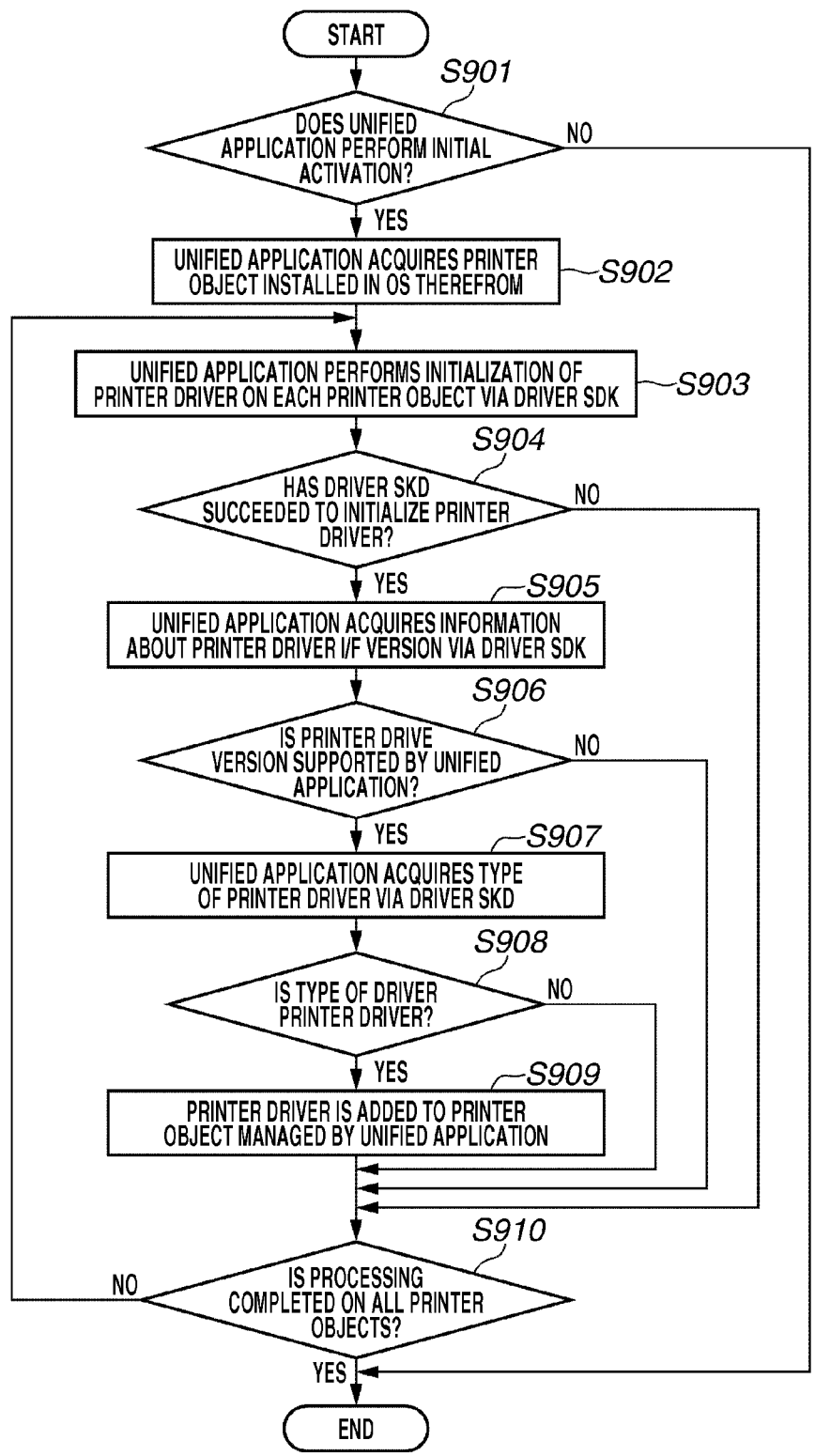

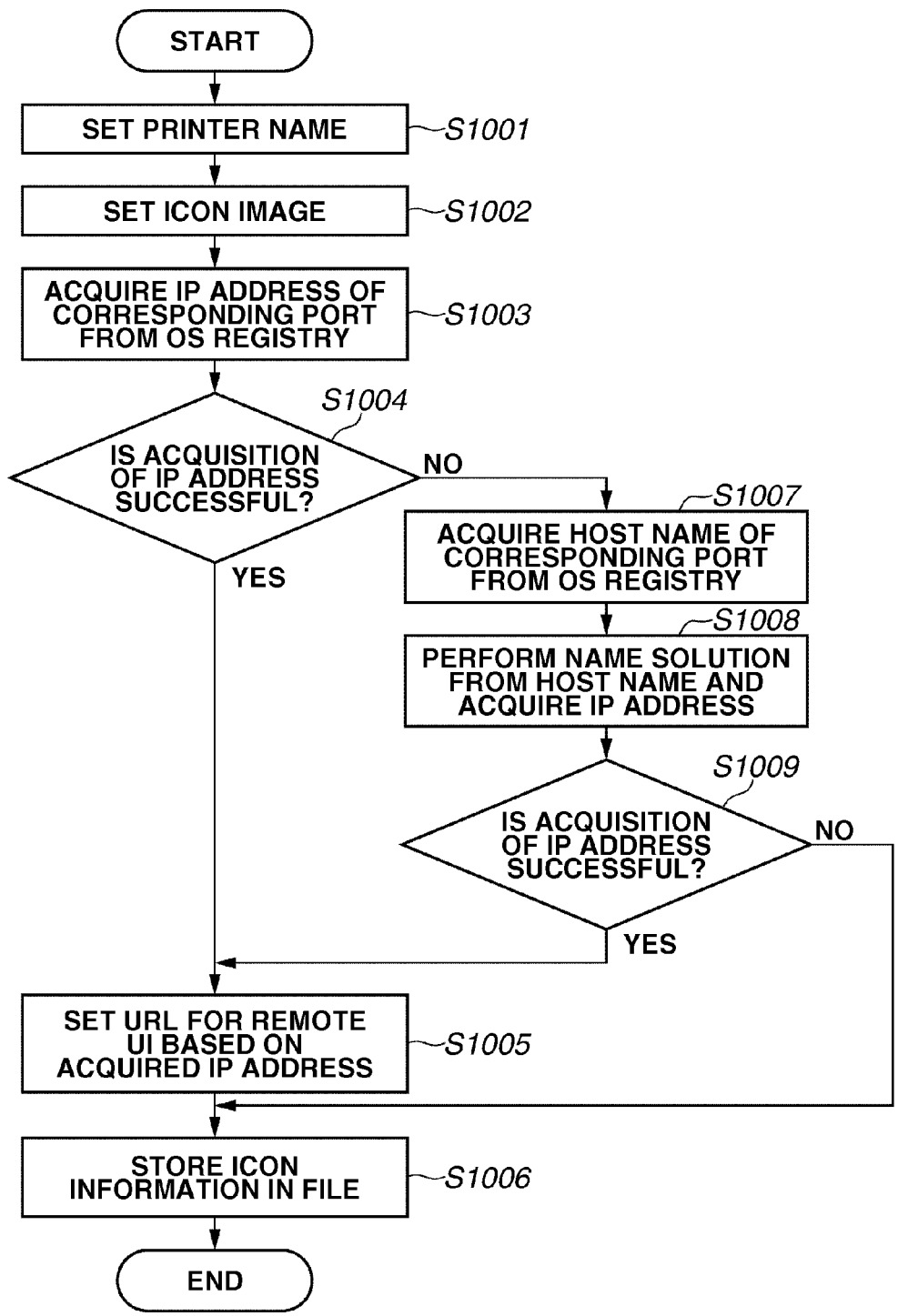

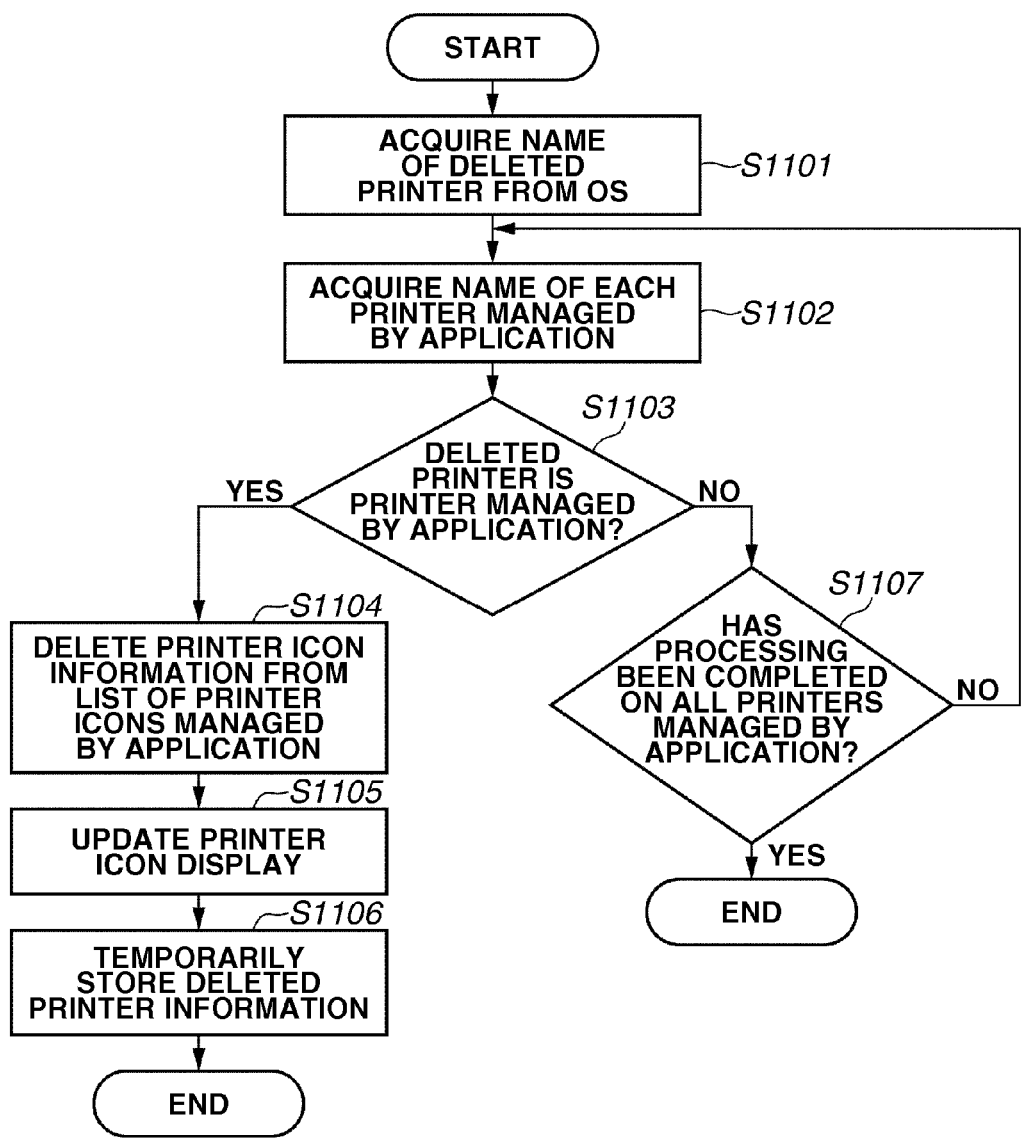

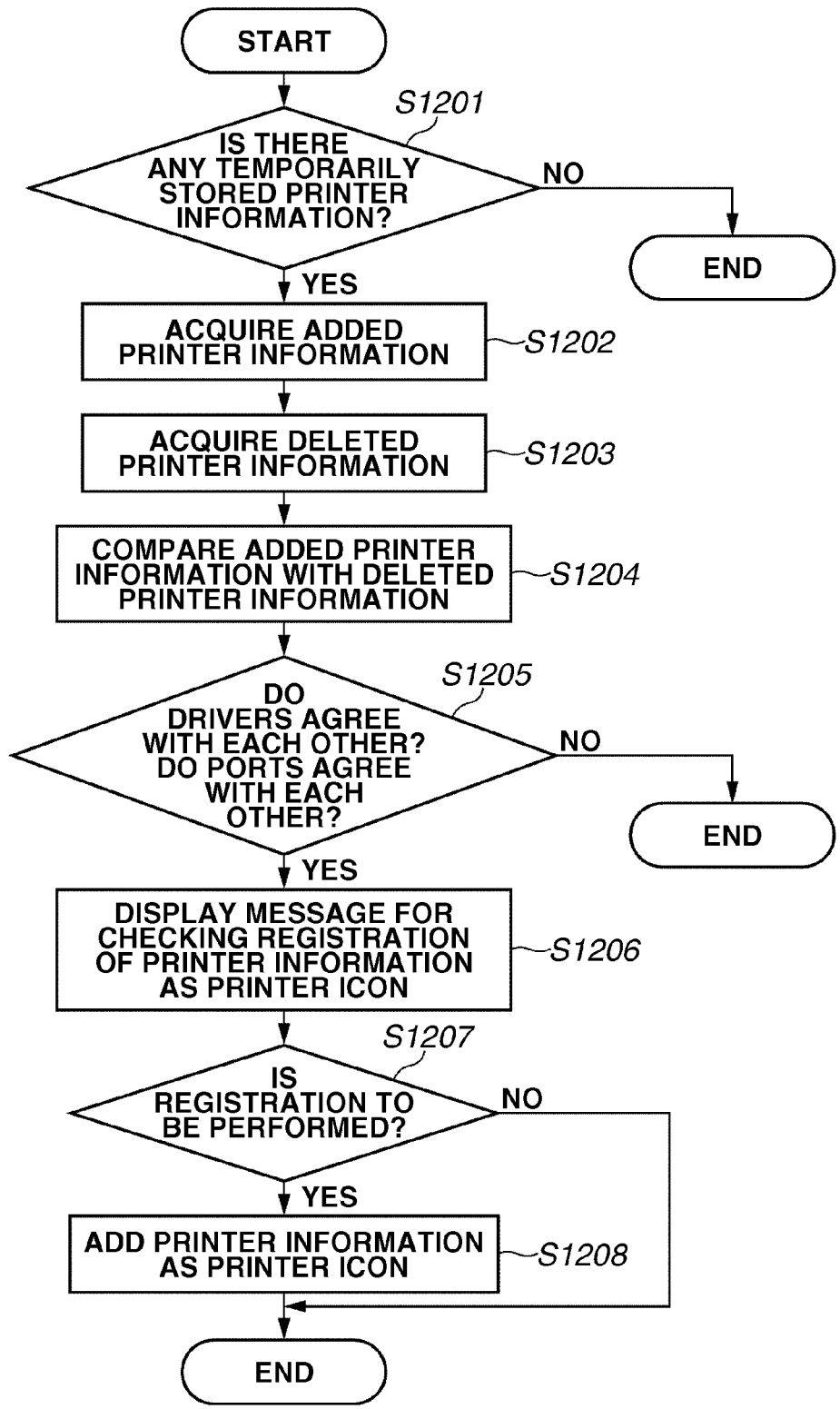

INFORMATION PROCESSING APPARATUS, INFORMATION PROCESSING METHOD AND STORAGE MEDIUM

BACKGROUND OF THE INVENTION

1. Field of the Invention

The present invention relates to a data managing method and program performed by an information processing apparatus which causes a complex machine to perform printing.

2. Description of the Related Art

Japanese Patent Application Laid-Open No. 11-025103 discusses a technique in which a document management application displays a printer icon, on which a user drops a display corresponding to a specified page of a document to start printing. To use this technique, the user needs to select a printer for making the best use of functions of the application, and further register the printer to the application every time using the printer, thereby causing inconveniences. Further, if all printers installed in an operating system (OS) are registered, unnecessary printers for the user, for example, printers which the user usually does not use or printers that cannot fully function due to poor compatibility with the application can be also registered.

SUMMARY OF THE INVENTION

According to an aspect of the present invention, an information processing apparatus including an application in which a user selects an icon of document data and drops the icon onto a device icon corresponding to an image forming apparatus to cause the image forming apparatus to perform image forming processing, the information processing apparatus comprising, an acquisition unit configured to acquire a device object, which is associated with a device driver and an output port, managed by an operating system of the information processing apparatus, a determination unit configured to determine whether a function of the device driver which is associated with the device object satisfies a condition for registration of a device icon which is associated with the device object by the application, a registration unit configured to, when the determination unit determines that the function satisfies the condition for registering the device icon, registering the device icon which is associated with the device object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of information about the management of the printer objects in the unified application.

FIG. 10 is a flowchart illustrating a procedure for registering a printer icon performed by the information processing apparatus.

FIG. 11 is a flowchart illustrating a procedure for adding a printer icon performed by the information processing apparatus.

FIG. 12 is a flowchart illustrating a procedure for deleting a printer object registered for a printer icon performed in the information processing apparatus.

FIG. 13 is a flowchart illustrating a procedure for adding a printer object performed in the information processing apparatus.

DESCRIPTION OF THE EMBODIMENTS

Various exemplary embodiments, features, and aspects of the invention will be described in detail below with reference to the drawings.

With reference to Figures, an example of an embodiment of the present invention will be described.

[System Configuration]

Figure 1:
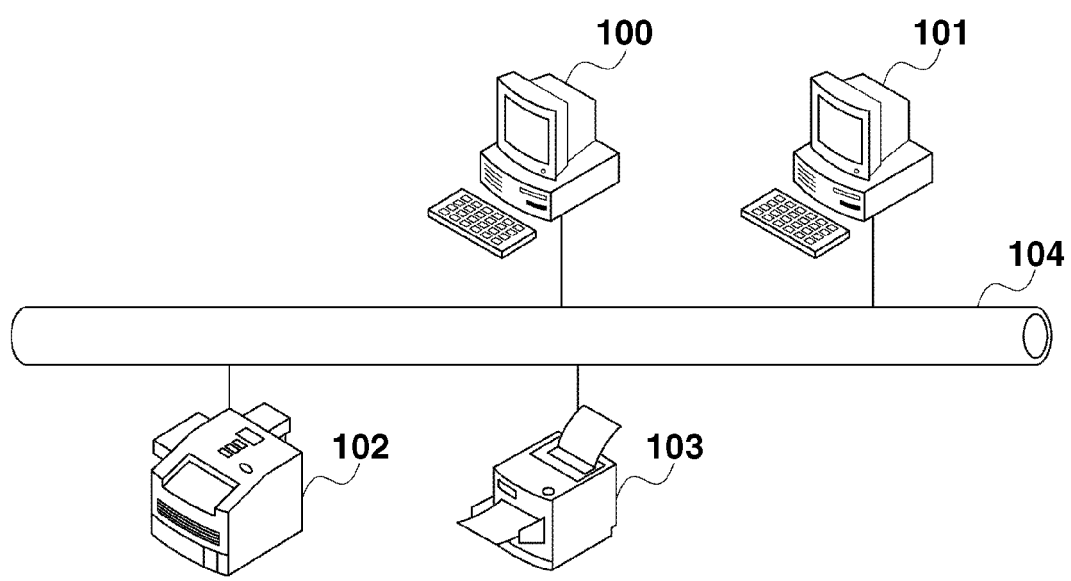
FIG. 1 illustrates a network configuration of a document management system.

FIG. 1 illustrates a configuration of a print control system according to an exemplary embodiment of the present invention. The present exemplary embodiment is a system in which an information processing apparatus 100 and a complex machine 102 capable of performing print processing can communicate with each other via a network. In FIG. 1, the information processing apparatus 100 is a computer transmitting print data to the complex machine 102. Further, the information processing apparatus 100 is a computer used by a user who gives an instruction for transmitting a fax.

An image processing apparatus 101 is a computer that serves as a document management server and performs mainly a storage of document data, management of transmission and reception of the document data between apparatuses, a security management, exclusion control processing between a plurality of users, and a management of a database storing the document data, in addition to network processing. The complex machine 102 (hereafter, referred to as a "complex machine") has a copy function, a scanner function, a printer function, a fax function, and a file transmission function. The complex machine 102 is an example of the image forming apparatus, and may be a laser printer 103 or an ink-jet printer having a single function.

A predetermined OS is installed in the information processing apparatus 100, and further, the OS gives an instruction for performing printing to a corresponding application referring to an identifier of each file.

A unified application for unifying and managing various types of functions on a desktop are installed in the information processing apparatus 100 of the present exemplary embodiment. The unified application has a processing function for improving fax operations, a function for arranging and managing information, a function for cutting a printing cost, a function for improving operations for digitizing paper, a function for an approval operation using digital documents, and a function for sharing information in an office.

FIG. 1 displays typical image forming apparatuses. Printers may be connected locally to the information processing apparatus 100 as well as via a network.

[Hardware Configuration (Information Processing Apparatus]

Figure 2:
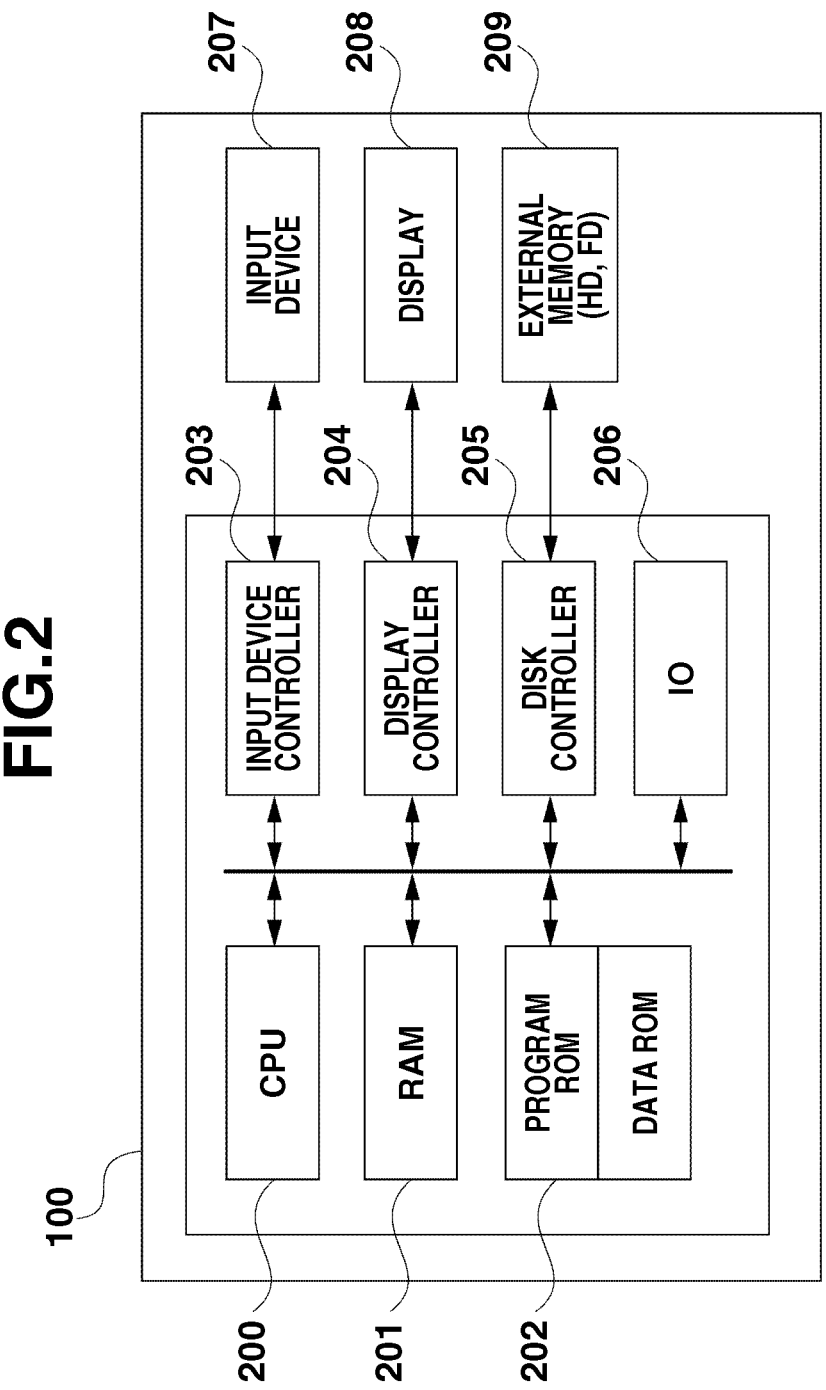
FIG. 2 illustrates a hardware configuration of an information processing apparatus.

A hardware configuration illustrated in FIG. 2 corresponds to that of a personal computer (PC). FIG. 2 illustrates a hardware configuration of the information processing apparatus 100 of the present exemplary embodiment. The image processing apparatus 101 can be also realized by a similar hardware. In FIG. 2, a central processing unit (CPU) 200 executes a program of the OS or an application that is stored in a read only memory (ROM) for a program in a ROM 202 or loaded from a hard disk 209 to a random access memory (RAM) 201.

Software configurations illustrated in FIG. 9 (including FIG. 9A and FIG. 9B), 10, 11, 12, and 13 or processing of each flowchart described below can be realized by executing the program described above. The RAM 201 functions as a main memory or a work area of the CPU 200. An input device controller 203 controls inputs from an input device 207 such as a keyboard and a mouse. A display controller 204 controls various types of displays 208 to be displayed.

A disk controller 205 controls data access to/from the hard disk 209 and a floppy disk (registered trademark) (not illustrated) that store various types of data. An input/output (I/O) interface 206 is connected to the network, and performs communication control processing with other devices connected to the network. Further, the I/O interface 206 may include a local interface function such as a universal serial bus (USB).

[Hardware Configuration (Complex Machine)]

Figure 3:
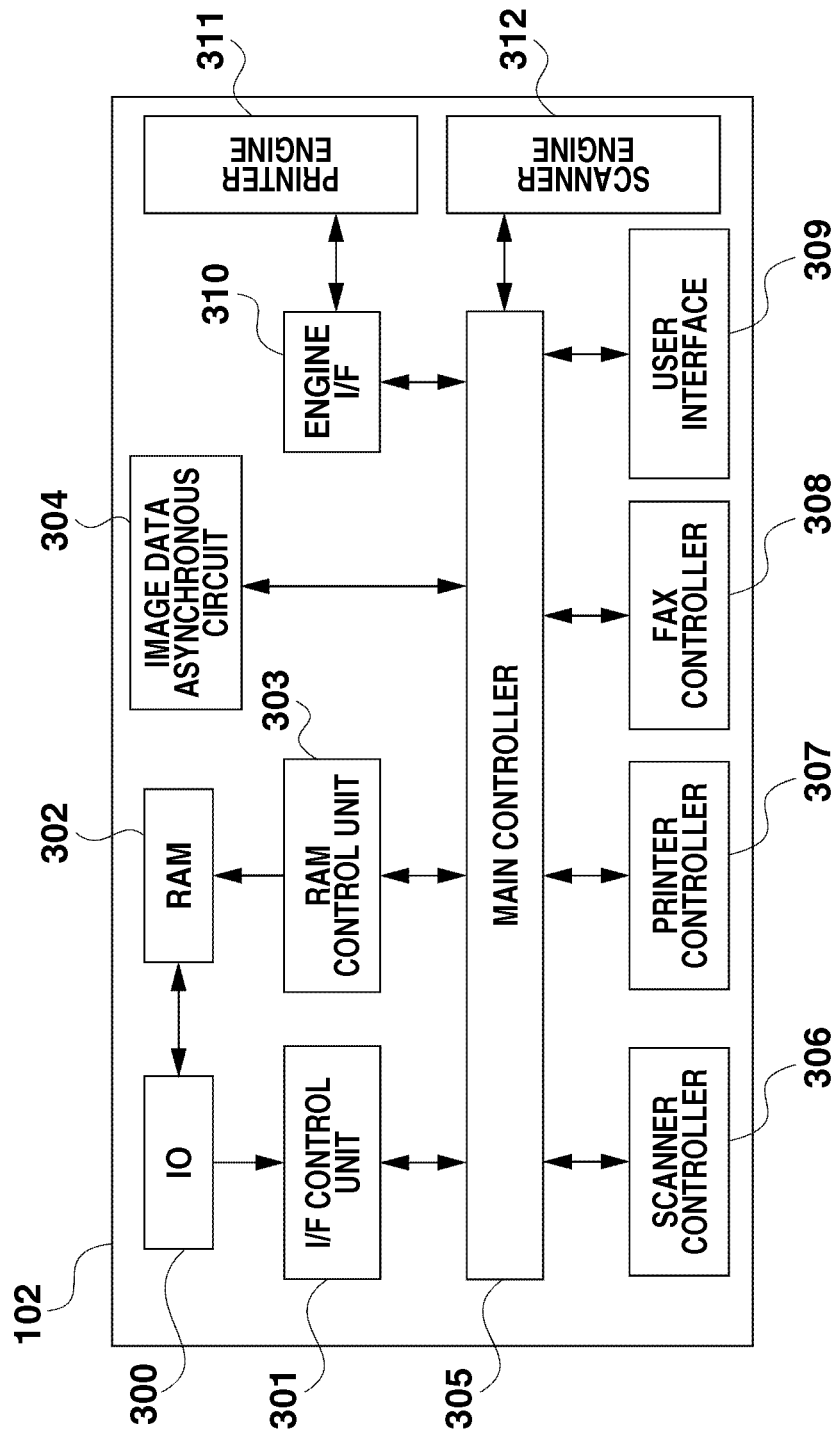
FIG. 3 is a block diagram illustrating a hardware configuration of a complex machine.

FIG. 3 is a block diagram illustrating a hardware configuration in the complex machine 102 illustrated in FIG. 1. This example illustrates a complex machine (Multi Functional Peripheral (MFP)) having the scanner function, the printer function, and the fax function. In FIG. 3, an I/O interface 300 is connected to the information processing apparatus 100 via a communication medium such as a network (local area network (LAN)) 104 and the USB.

A plurality of I/O interface 300 may be mounted on the complex machine 102 to deal with a plurality of connection forms. Via the I/O interface 300, the complex machine 102 transmits device identification (ID) and a scanning image to the information processing apparatus 100. Further, the complex machine 102 receives various types of control commands from the information processing apparatus 100 to perform processing.

An interface (I/F) control unit 301 controls a processing system including a scanner, a printer, and a fax mounted on the complex machine 102 to issue each device ID thereof. A fax controller can transmit fax data to a public line (not illustrated) or a communication path to carry out an Internet fax.

A RAM 302 is a primary storage device, which stores external data such as the control commands acquired via the I/O interface 300 or an image read by a scanner engine 312. Further, the RAM 302 stores the image expanded by a printer controller 307 before the image is transmitted to a printer engine 311. A RAM control unit 303 performs an allocation and a management of the RAM 302.

An image data asynchronous circuit 304 outputs an image that is read by the printer controller 307 or a scanner engine 312 and expanded by the RAM control unit 303 according to a rotation of a printer engine 311. The printer engine 311 develops the image onto an output medium such as paper. A main controller 305 performs various types of controls on the printer engine 311 via an interface (I/F) 310.

Further, the main controller 305 is an essential control module. The main controller 305 performs processing for appropriately allocating control languages received from the information processing apparatus 100 to the scanner controller 306, the printer controller 307, and the fax controller 308 via the I/O interface 300.

Furthermore, the main controller 305 performs control on the printer engine 311 and the scanner engine 312 being supported by respective controllers and the user interface 309. By unifying control interfaces between the main controller 305 and various types of controllers, an extension board capable of processing a plurality types of control commands can be mounted on a peripheral device.

The main controller 305 acquires from each controller and manages a device ID of an extension controller that is currently mounted. The scanner controller 306 resolves scanning control commands received from the information processing apparatus 100 into an internal execution instruction which the main controller 305 can interpret.

Further, the scanner controller 306 changes the image read by the scanner engine 312 into the scanning control commands. The printer controller 307 resolves a page description language received from the information processing apparatus 100 into the internal execution instruction including an expanded image of the page description language which the main controller 305 can interpret.

The expanded image is transmitted to the printer engine 311 and printed onto the output medium such as paper. The fax controller 308 expands an image a fax control language received from the information processing apparatus 100 and transmits the image to another fax device via the public line or the Internet.

The user interface is used as an input/output unit of an instruction given by the user when the complex machine 102 directly performs various types of settings on the main controller 305, the scanning function, the printing function, or the fax function. The scanner engine 312 reads a printed image using an optical apparatus according to an instruction given by the main controller 305, converts the read image into electrical signals, and transmits the electrical signals to the main controller 305.

[Screen for Displaying List of Printer Objects in OS]

Figure 4:
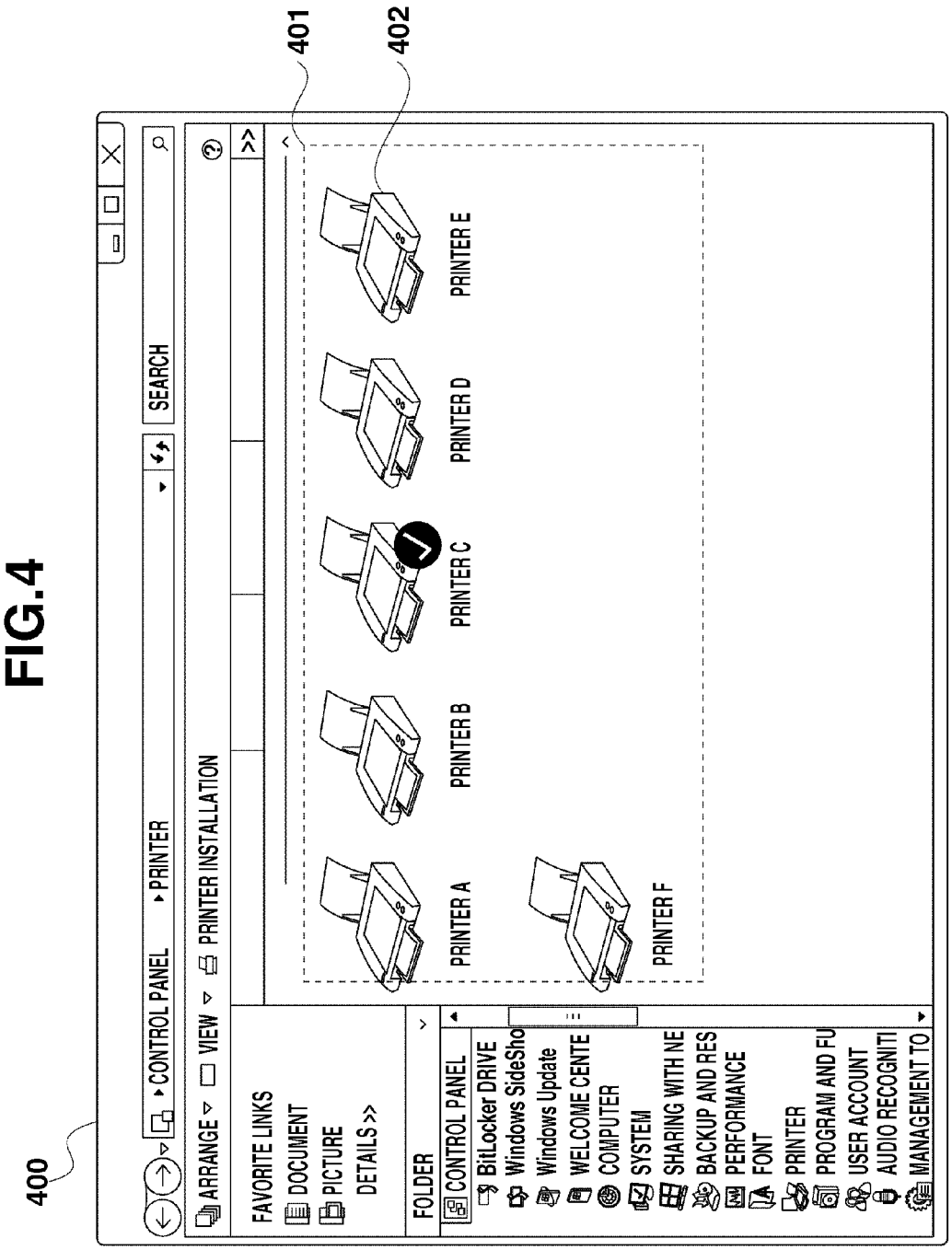
FIG. 4 illustrates an example of a user interface displaying a list of printer objects in an operating system (OS).

FIG. 4 schematically illustrates a screen for displaying printer objects managed by the OS of the information processing apparatus 100. On a screen 400 for displaying the printer objects which corresponds to the display 208 illustrated in FIG. 2, a list 401 of all printer objects installed in the OS is displayed.

Together with addition and deletion of the printer objects to/from the OS, printer objects 402 displayed on the list 401 of the printer objects are updated. For example, in response to the complex machine 102 connected to the network or the USB, the device ID is transmitted to the OS of the information processing apparatus 100. The OS selects and installs the printer driver corresponding to the device ID.

Sequentially, the OS registers the printer object corresponding to the complex machine on a registry and generates an icon 402. This printer object managed by the OS corresponds to a printer object 602 managed by the OS illustrated in FIG. 6.

Further, the user can manually set a driver. An icon 401 corresponding to the printer driver that is automatically or manually installed is displayed. FIG. 4 illustrates an example in which printer drivers and printer icons are displayed. However, fax drivers and fax icons may also be displayed.

[Screen for Displaying Printer Objects in Unified Application]

Figure 5:
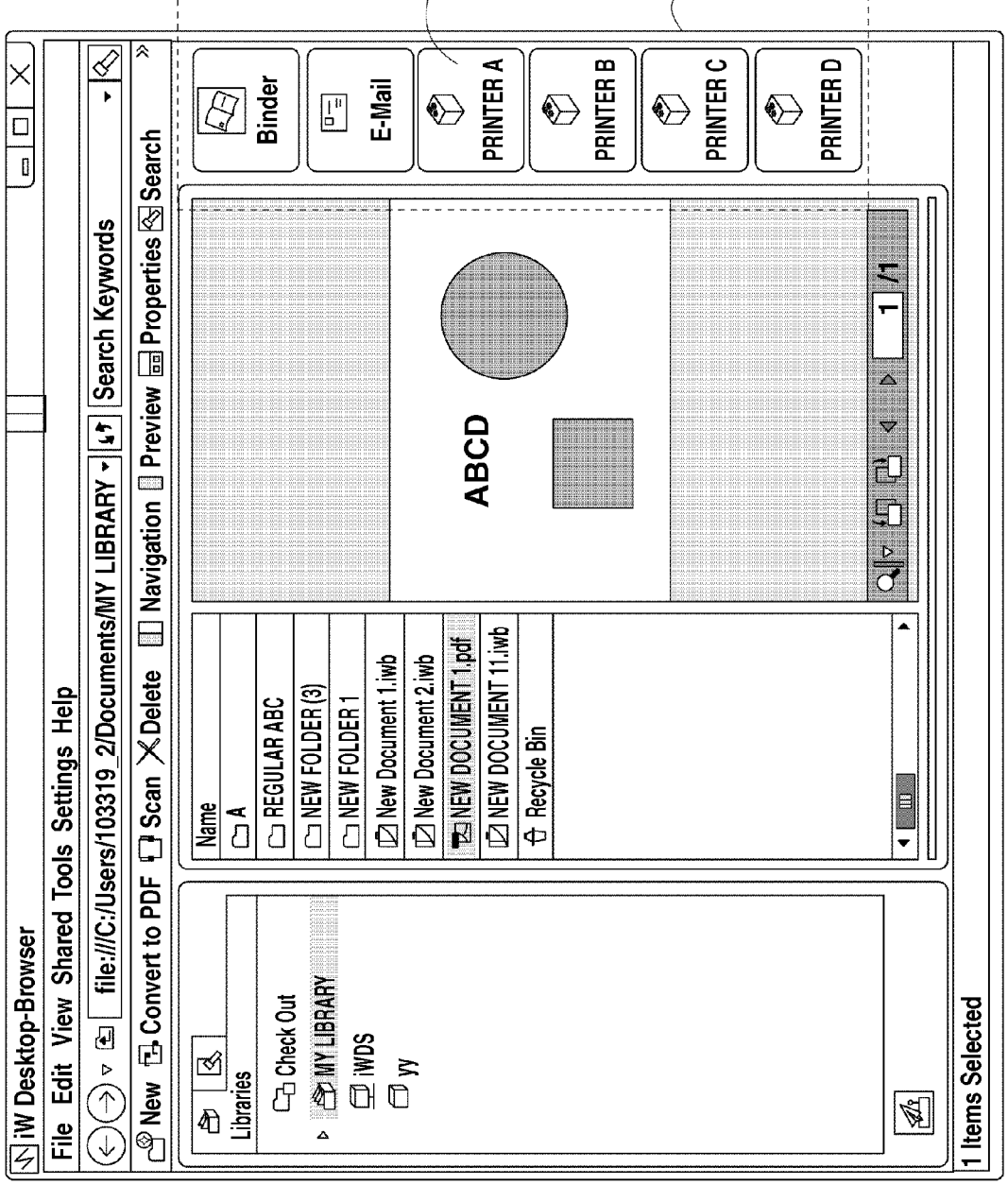
FIG. 5 illustrates an example of a user interface displaying a list of printer objects in a unified application.
Figure 6:
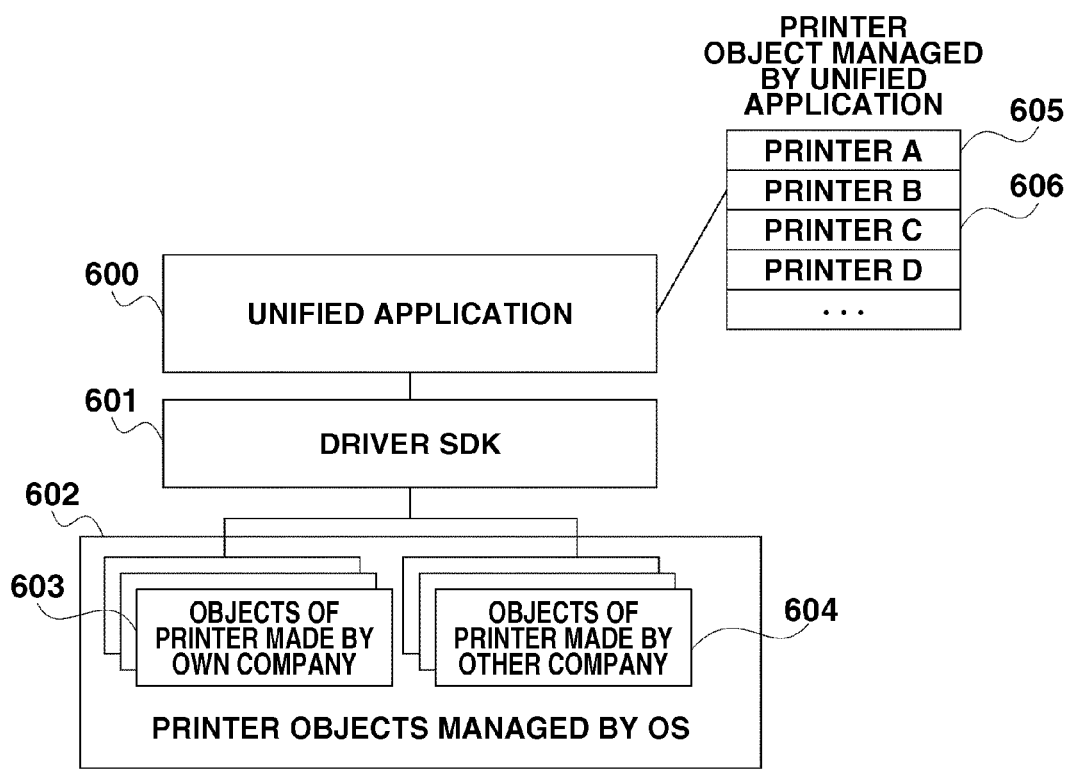
FIG. 6 is a block diagram illustrating a software configuration of the information processing apparatus and a management of the printer objects.

FIG. 5 schematically illustrates a graphical user interface (GUI) of a unified application 600 illustrated in FIG. 6 in the information processing apparatus 100. A main screen 500 of the unified application 600 includes a printer icon display unit 501. All the printer objects managed by the OS do not need to be registered as icons.

From among the printer objects to be managed by the OS, the printer objects managed by the unified application 600 are selected and displayed as printer icons 502. A method for selecting and initially registering the printer icons 502 will be described below in detail. A printer icon display unit 501 includes a function for displaying printing instructions to a printer icon 502 and icons corresponding to a printer "B", a printer "C", and a printer "D", and for displaying a status of the complex machine.

The user interface is used for selecting a document displayed on the main screen 500, receiving operations of clicking the printer icon which corresponds to the complex machine for outputting the document, and performing drag-and-drop of the document onto the printer icon from the user, and outputting the selected document in the specified complex machine.

Further, an icon of an arbitrary application is registered in the printer icon display unit 501, too. When a user select the icon of the arbitrary application, the arbitrary application is activated. The printer icon 502 registered on the printer icon display unit 501 may be added or deleted by a user's operation using the mouse. For example, a printer object which is desired and often used by the user, may be registered.

FIG. 5 illustrates a state in which the user accesses a folder "MY LIBRARY" in the image processing apparatus 101 on the network. The "MY LIBRARY" stores a plurality of folders and a plurality of data beneath a label, "name". In FIG. 5, one-page data "NEW DOCUMENT 1.pdf" is selected, and a preview of letters "ABCD" and figures of a circle and a rectangular is displayed.

[Software Configuration]

FIG. 6 is a block diagram illustrating a software of the information processing apparatus 100 illustrated in FIG. 1. The software is stored in the hard disk 209 in the information processing apparatus 100 illustrated in FIG. 2 to be read by the RAM 201 and executed by the CPU 200.

Printer objects 602 are managed by the OS and correspond to the list 401 illustrated in FIG. 4. FIG. 6 also illustrates printer objects 603 and printer objects 604. Each printer object is associated with a printer driver (may include a plurality of dynamic link libraries (DLL)) or a fax driver (may include a plurality of DLL), and an output port corresponding to a complex machine, to which a print job is transmitted.

A communication protocol of the output port includes an internet printing protocol (IPP), a transmission control protocol/internet protocol (TCP/IP), a line printer daemon protocol (LPR), and protocols corresponding to a predetermined cable (cable of Centronics, USB or IEEE1394) or a wireless adaptor (Bluetooth) that do not function via the network. The output port depends on the communication protocols described above and transmits the data to the image processing apparatus.

To cooperate with the application, the printer driver can publicize the IF for controlling the function of the printer driver from the program. A printer driver software development kit (SDK) 601 refers to a program for controlling a bridge between the application and the printer driver via the IF. For example, the printer driver SDK notifies the unified application 600 of information on a company that developed the printer driver.

According to the present exemplary embodiment, a self-made printer object 603 refers to an object having a printer driver developed by a company that develops the unified application, and a printer object 604 refers to an object made by another company. If the IF of the printer driver is publicized and information about the controllable printer driver can be acquired, differences between the self-made printer object and the printer object made by another company are not very serious.

A printer object 605 is managed by the unified application and displayed in the printer icon display unit 501 illustrated in FIG. 5, and stored as the data in the ROM 202 or as storage data in the hard disk 209. The unified application 600 accesses the printer objects 603 and 604 via the printer driver SDK 601. Via the printer driver SDK 601, information necessary for determining whether the printer object includes the self-made printer driver, and information about the printer driver such as the type or the version of the printer driver can be acquired.

[Printer Object Management Information in OS]

Figure 7:
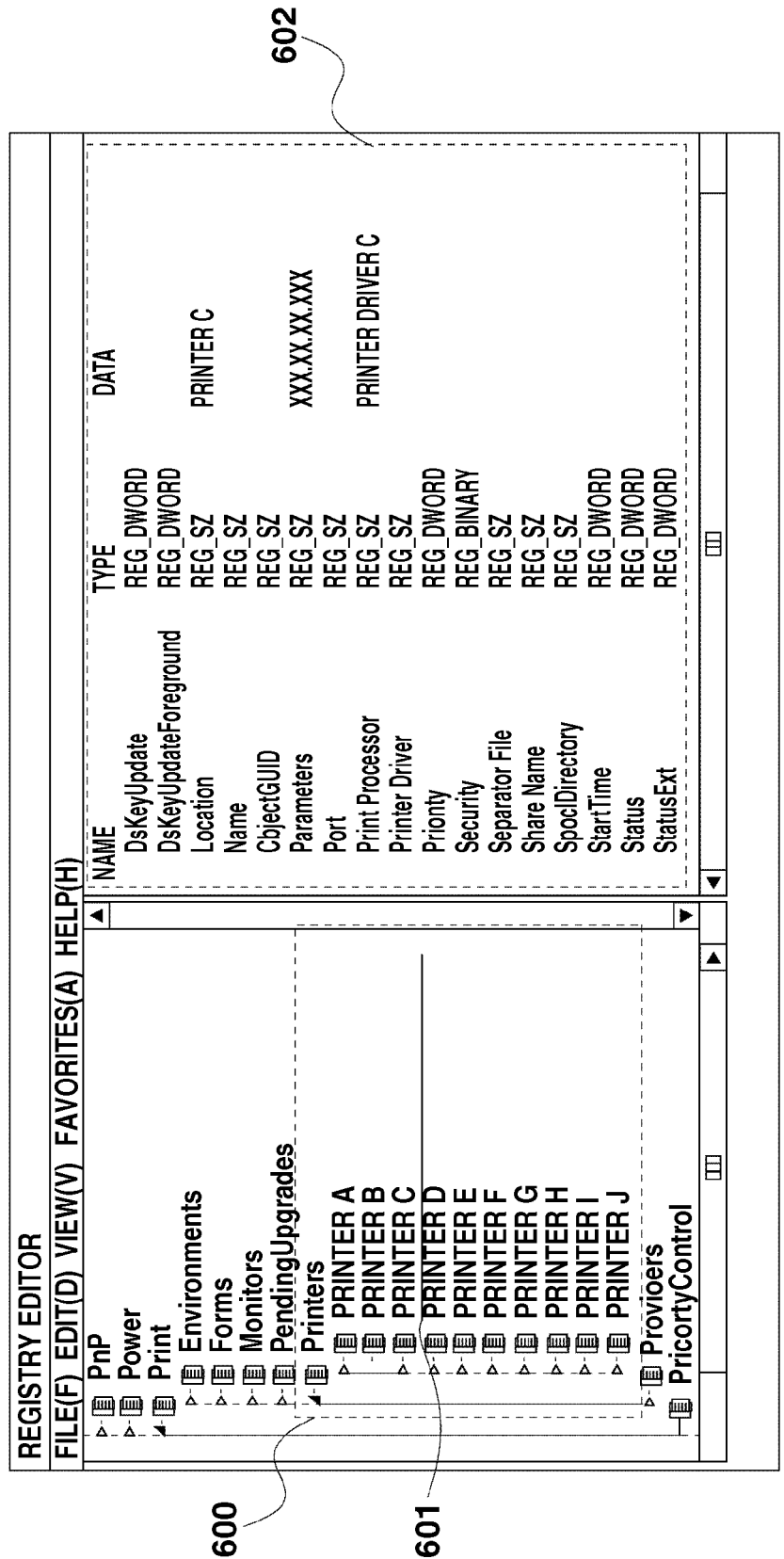
FIG. 7 illustrates an example of a user interface displaying information about the management of the printer objects in the OS.

FIG. 7 schematically illustrates the management information 602 about the printer object in the OS. Various kinds of information 702 about a printer object including a printer object 700 installed in the OS, a printer name of each printer object 701, a name of an output port, a name of a printer driver are stored in a registry region of the OS.

FIG. 7 illustrates an example in which printers "A", "B", "C", "D", "E", "F", "G", "H", "I", and "J" are registered. If the printers "G", "H", "I", and "J" are deleted and the printers "A", "B", "C", "D", "E", and "F" are registered, the printers "A", "B", "C", "D", "E", and "F" are displayed on the display screen 400 illustrated in FIG. 4. In FIG. 7, the printer "C" is selected, and the management information 602 stores a name 602 of a printer "PRINTER C", port setting information, and a name of a printer driver "PRINTER DRIVER C". A set of information described above is the management information of the printer object.

[Printer Object Management Information in Unified Application]

FIG. 8 illustrates an example of the printer icon information 700 stored by the unified application 600. The printer icon information 700 stored by the unified application 600 includes the name of the printer icon and the name of the printer object of each printer icon information, and the unified application 600 stores as files the information 700 in the hard disk 209 or the ROM 202 of the information processing apparatus 100. Details will be described below.

A tag 701 indicates a definition range of the printer icon 700 stored by the unified application 600. Respective tags 702, 703, and 704 indicate a definition range of each printer icon information. An attribute 705 indicates a type of a printer icon. An attribute 706 indicates a name of a printer icon displayed as the printer icon 502 of the unified application 600.

An attribute 707 indicates a file path storing an image file of the printer icon image displayed as the printer icon 502 of the unified application 600. An attribute 708 indicates a name of a printer object corresponding to the printer icon 502 of the unified application 600.

An attribute 709 indicates a uniform resource locator (URL) of a remote user interface that can be displayed from the printer icon 502 of the unified application 600. The URL of the remote user interface includes an Internet protocol (IP) address of the complex machine. By accessing the URL via an Internet browser, a status of the complex machine and detailed information about devices can be displayed.

[Print Processing Flow Performed by Unified Application]

Figure 9B:
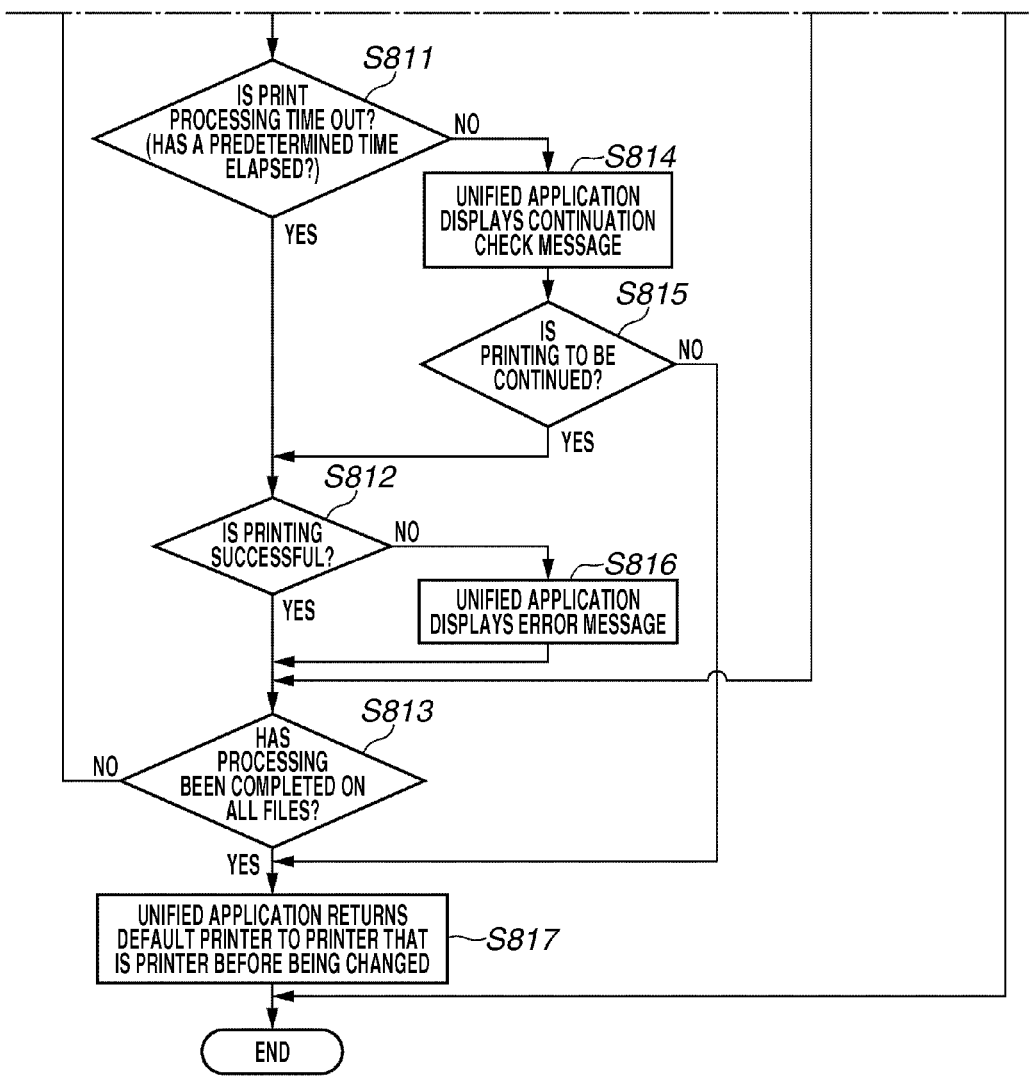
FIG. 9 (including FIG. 9A and FIG. 9B) is a flowchart illustrating a print procedure performed by the information processing apparatus.

FIG. 9 (including FIG. 9A and FIG. 9B) is a flowchart illustrating an example of a printing instruction procedure performed by the information processing apparatus of the present exemplary embodiment. More specifically, FIG. 9 shows that, on the main screen 500 of the unified application displayed on the ROM 202, when the user selects a document using the input device 207 such as a pointing device and gives a printing instruction to the printer icon 502 of the printer icon display unit 501, the unified application receives an instruction for operating the functions from the user and gives the instruction for printing the selected document to the specified complex machine.

Steps S801, S802, S803, S804, S805, S806, S807, S808, S809, S810, S811, S812, S813, S814, S815, S816, and S817 indicate respective steps, and are realized when the CPU 200 loads the unified application and the drivers stored in the ROM 202 or the hard disk 209 into the RAM 201, and executes the unified application and the drivers.

Further, the processing described above can be performed, when a document is selected on the main screen 500 of the unified application illustrated in FIG. 6 and the unified application receives clicking operations or drag-and-drop for the printer icon 502 on the printer icon display unit 501.

First, in step S801, the unified application displays a print check screen to check whether to start printing on the display 208. The unified application receives the instruction for performing printing from the user via the print check screen, and then start print processing. When the user selects a cancel of printing via the print check screen, the processing is completed.

In step S803, the unified application acquires the file path indicating a storage of the document on the OS selected via the main screen 500. A plurality of documents may be selected. In step S804, the unified application gives to the OS an instruction for changing the printer object (default printer) usually used by the OS, to the printer object corresponding to the printer icon 502 specified via the printer icon display unit 501. The OS that has received the instruction changes the default printer.

Sequentially, the unified application performs following processing on each selected document file.

In step S805, the unified application determines whether a file format of the selected document is uniquely defined by the unified application. The file format uniquely defined by the unified application refers to a file format storing the image file of the document and print setting information defining the printing instruction to the complex machine. The file format uniquely defined by the unified application can also set and store the information about the print setting performed by the unified application to the document.

In step S805, when it is determined that the file format of the document is uniquely defined by unified application (YES in step S805), the processing proceeds to step S806 so that the unified application acquires the print setting information stored in the file. In step S807, the acquired print setting information is reflected on the print setting information of the printer object of the default printer. In step S808, the default printer receives the printing instruction.

On the other hand, in step S805, when it is determined that the file format of the document is not uniquely defined by the unified application (NO in step S805), an application associated with the file format of the document on the OS is activated to perform printing.

More specifically, in step S809, the unified application specifies via the OS that the application associated with the format of the document performs printing after being activated. In step S810, the unified application specifies a file path of a selected document, and gives an instruction of activation to the associated application. The associated application having received the instruction of activation gives an instruction to the default printer to print the file specified when the associated application has been activated. The unified application waits for the processing of the associated application to be completed.

If the driver set for the printer object is a portable document format file (PDF) generation driver, the printing instruction to the default printer includes an instruction for generating the PDF generation driver. A default printer refers to a printer currently set as an output destination in the OS. A concept of printers may be extended and a similar concept may be applied to fax apparatuses.

In step S811, the unified application determines whether a predetermined time defined for the unified application has elapsed since the application starts to perform the print processing. When the processing is completed within the predetermined time (YES in step S811), in step S812, the unified application receives processing results from the application having performed the print processing and determines whether the print processing has succeeded. When the print processing has succeeded (YES in step S812), the processing proceeds to step S813.

In step S811, when the application has not completed the print processing even after the predetermined time has elapsed (NO in step S811), the unified application displays the screen for checking whether to continue the print processing. In step S815, the unified application receives the user's instruction and determines whether to continue the print processing according thereto. When the unified application determines to continue the print processing (YES in step S815), the application performing the print processing continues the processing. When the print processing is canceled (NO in step S815), an instruction for canceling the processing is given to the application performing the print processing and the processing proceeds to step S813.

Further, in step S812, when it is determined that the print processing performed by the application has failed, the unified application displays a message for notifying that the print processing has failed.

In step S813, the unified application determines whether the processing is completed on all files of selected documents. When the processing is not completed on all the files (NO in step S813), the processing after steps S805, S806, S807, S808, S809, S810, S811, and S812 are continuously performed on a file of a following document. When the processing is completed on all the files (YES in step S813), in step S817, the unified application specifies a name of the temporarily stored default printer before it is changed and gives an instruction to the OS to set the default printer.

The OS that has received the instruction changes the changed default printer on the OS to the default printer before its change which is specified by the unified application. In other words, the OS changes (performs switching processing) the default printer to a printer object having a name of the printer before its change and ends this processing. A name of a printer is shown as an example of a name of a printer and a name of a device.

[Flow of Printer Icon Registration in Unified Application]

FIG. 10 is a flowchart illustrating an example of a procedure for registering a printer icon performed by the information processing apparatus of the present exemplary embodiment. As an example, when the unified application 600 is initially activated, a printer object of a printer driver recommended to be used for the unified application is registered on the printer icon display unit 501 as the printer icon 502.

Steps S901, S902, S903, S904, S905, S906, S907, S908, S909, and S910 are realized when the CPU 200 loads the unified application and the drivers stored in the ROM 202 or the hard disk 209 into the RAM 201, and executes the unified application and the drivers.

This processing is performed when the unified application receives the activation instruction in the information processing apparatus.

First, in step S901, the unified application receives the activation instruction. When the unified application is activated, application setting information including information about whether it is an initial activation of the unified application stored in the hard disk 209 is read into the RAM 201, and the CPU 200 performs control to determine whether the activation is initially performed. When it is determined that the activation is initially performed (YES in step S901), in step S902, the unified application demands from the OS the printer objects installed therein, and acquires the names of all the printer objects installed therein.

When it is determined that the activation is not initially performed (NO in step S901), this processing is ended. In step S903, the unified application specifies names of the acquired printer objects and performs initialization processing on the IF provided by the printer drivers associated with the printer objects via the printer driver SDK 601. The unified application receives results of the initialization processing from the printer driver SDK 601, and, in step S904, determines whether the initialization processing has succeeded.

When it is determined that the initialization processing has succeeded (YES in step S904), the processing proceeds to step S905. When it is determined that the initialization processing has failed (NO in step S904), it is determined that the printer driver is not provided with the IF which the unified application can control. The unified application does not perform a (initial) registration of the printer icon but completes the processing on the printer object. The processing, then, proceeds to step S910.

In step S905, the unified application uses the IF provided by the printer driver via the printer driver SDK 601 to give to the printer driver an instruction for acquiring version information about the printer driver. The printer driver that has received the instruction acquires the version information defined in the IF module stored in the hard disk 209 or loaded in the RAM 201, and returns a value to the unified application via the printer driver SDK 601.

Upon receiving the acquired version information from the printer driver, in step S906, the unified application compares version information about the printer driver defined and supported by the unified application with the version information acquired from the printer driver to determine whether the acquired version is the same as the version of the printer driver supported by the unified application.

When it is determined that the acquired version is the same as the version supported by the unified application (YES in step S906), the processing proceeds to step S907. When it is determined that the acquired version of the printer driver is not same as the version supported by the unified application (NO in step S906), the unified application does not perform the registration of the printer icon but completes the processing on the printer object. The processing, then, proceeds to step S910.

In step S908, the unified application uses the IF provided by the printer driver via the printer driver SDK 601 to give to the printer driver an instruction for acquiring a type of the driver. A type of a driver refers to a printer driver for giving a printing instruction, or a fax driver for giving a fax transmission instruction.

The printer driver having received the instruction acquires the type of the driver defined in the IF module that is stored in the hard disk 209 or loaded in the RAM 201, and returns a value to the unified application via the printer driver SDK 601. Upon receiving the acquired driver information from the printer driver, in step S908, the unified application determines whether the acquired type of the driver is the printer driver.

When the unified application determines that the type of the driver is the printer driver (YES in step S908), the processing proceeds to step S909. When unified application 600 determines that the type of the driver is not the printer driver (NO in step S908), the unified application does not register a printer icon but completes the processing on this printer object. The processing, then, proceeds to step S910.

In step S909, the unified application manages the printer object, and generates printer icon information of the printer object by printer icon addition processing illustrated in FIG. 11. The unified application sets the printer icon of the printer object and ends the processing.

[Printer Icon Information Generation Flow Performed by Unified Application]

FIG. 11 is a flowchart illustrating an example of a procedure for adding a printer icon, performed by the information processing apparatus of the present exemplary embodiment. As an example, printer icon information is generated when the printer icon is registered.

Steps S1001, S1002, S1003, S1004, S1005, and S1006, are realized when the CPU 200 loads the unified application and the drivers stored in the ROM 202 or the hard disk 209 into the RAM 201, and executes the unified application and the drivers.

This processing is performed when the printer icon is registered in the initial activation of the unified application 600 as illustrated in FIG. 10 or when the user registers the printer icon via the main screen 500 of the unified application 600.

In step S1001, the unified application sets a name of a printer object specified as the printer icon to be registered as illustrated in FIG. 10, or a printer object specified via a printer icon registration screen (not illustrated) displayed by the unified application. The unified application sets the printer object name as the printer icon information corresponding to the printer name 706 and the printer object name 708 of the printer icon information 700 illustrated in FIG. 8.

In step S1002, the unified application sets a file path for a storage of the printer icon image specified by the user via the printer icon registration screen, as the printer icon information corresponding to the printer icon image 707 of the printer icon information 700.

In step S1003, the unified application requests from the OS an IP address of an output port allocated to the specified printer object. Upon receiving the instruction, the OS refers to registry information managed thereby, and returns a value of the IP address of the port to the unified application.

Upon receiving the IP address from the OS, in step S1004, the unified application determines whether it has succeeded in acquiring the IP address. When the unified application determines that it has succeeded in acquiring the IP address (YES in step S1004), the processing proceeds to step S1005. If the unified application fails in acquiring the IP address (NO in step S1004) for some reasons, for example, that the IP address is not defined for the registry, in step S1007, the unified application requires a host name of the output port allocated to the specified printer object.

Upon receiving the instruction, the OS refers to the registry information managed thereby, and returns a value of the host name of the port to the unified application. When the host name is received from the OS, in step S1008, the unified application gives an instruction for a name solution of the acquired host name, and acquires the IP address from the OS.

Upon receiving the IP address from the OS, in step S1009, the unified application determines whether the unified application has succeeded in acquiring the IP address. When the unified application determines that it has succeeded in acquiring the IP address (YES in step S1009), the processing proceeds to step S1005. When it is determined that the unified application has failed in acquiring the IP address (NO in step S1008), the unified application does not set printer icon information corresponding to the printer icon image 707 of the remote user interface included in the printer icon information 700. The unified application keeps the printer icon information null, and the processing proceeds to step S1006.

Further, when the unified application determines that it has succeeded in acquiring the IP address (YES in step S1008), in step S1005, the unified application converts the acquired IP address into the URL for the remote user interface, and then sets the converted IP address as the printer icon information corresponding to the printer icon image 707 of the remote user interface included in the printer icon information 700.

After the processing described above has been completed, in step S1006, the unified application stores the set printer icon information in the hard disk 209 as the printer icon information 700. The set printer icon information described above is also selected as the printer icon of the activated unified application.

The flow for registering the printer icon in an early stage is described as above. Printer icons that are not supported by the SDK can be manually registered as icons of the unified application. However, in that case, operations of the printer icon may not be guaranteed to be in the best printing state. Further, a fax icon can be also manually registered on the unified management application.

[Flow Performed by Unified Application when Printer Object is Deleted]

FIG. 12 is a flowchart illustrating an example of a procedure for deleting a printer icon performed by the information processing apparatus of the present exemplary embodiment. When a name of a printer object is changed in the OS, an event of a change which an application can detect is "a printer object having a name before it is changed is deleted, and a printer object having a changed name is added"

In this example and a next example of processing for adding a printer object, when a name of a printer object managed by the unified application is changed, the change is reflected on a printer object managed by the unified application.

Steps S1101, S1102, S1103, S1104, S1105, S1106, and S1107 are realized when the CPU 200 loads programs stored in the ROM 202 or the hard disk 209 into the RAM 201, and executes the programs.

When a printer object existing in the OS is deleted, the unified application monitors the change of the printer object on the OS. The processing is, then, started in response to detection of the printer object to be deleted, or in response to notification from the OS of the printer object to be deleted.

In step S1101, the unified application acquires from the OS the printer name of the deleted printer object. In step S1102, the unified application acquires the name of each printer object managed thereby while referring to the printer icon information 700 managed thereby.

In step S1103, it is determined whether the name of the deleted printer object corresponds to the name of the printer object managed by the unified application acquired by the step S1102. When it is determined that the name of the deleted printer object corresponds to the name of the printer object managed by the unified application acquired by the step S1102 (YES in step S1103), in step S1104, the printer icon information that corresponds to the name of the printer object deleted by the OS and managed by the unified application is deleted. The printer icon information corresponding to the deleted printer object is removed from a list (printer icon information 700) of the printer icons registered on the unified application, and overwritten onto the hard disk 209.

In step S1105, based on the updated printer icon information 700, the unified application updates a display on the printer icon display unit 501. In step S1106, the unified application temporarily (as a temporary deletion list) stores in the program the name of the printer driver and the name of the output port of the deleted printer object as the deleted printer object information.

The printer object information is deleted after a predetermined time defined by the unified application has elapsed. With this arrangement, the deleted printer object is temporarily stored as the temporary deletion list.

On the other hand, when it is determined that the name of the deleted printer object does not correspond to the name of the printer object managed by the unified application acquired by the step S1102 (NO in step S1103), the processing proceeds to step S1107 to determine whether the processing has been performed on all the printer objects managed by the unified application. When the processing has been performed on all the printer objects (YES in step S1107), the processing is ended. When the processing has not been performed on all the printer objects (NO in step S1107), the processing proceeds to step S1102 to perform the following processing. The processing in step S1106 may not be performed.

[Flow Performed by Unified Application when Printer Object is Added]

FIG. 13 is a flowchart illustrating an example of a procedure for adding a printer icon, performed by the information processing apparatus of the present exemplary embodiment. As an example of this processing and processing for deleting a printer object described with reference to FIG. 13, when a name of a printer object managed by the unified application is changed, the processing is performed which reflects the change on a printer object managed by the unified application.

Steps S1201, S1202, S1203, S1204, S1205, S1206, S1207, and S1208 are realized when the CPU 200 loads the unified application and the drivers stored in the ROM 202 or the hard disk 209 into the RAM 201, and executes the unified application and the drivers.

When the printer object is added on the OS, the unified application monitors the changes of the printer object on the OS. This processing is started in response to detection of the printer object to be added, or in response to notification from the OS of the printer object to be added.

In step S1201, the unified application determines whether there exists the printer object information (temporary deletion list stored in step S1106 illustrated in FIG. 12), which is temporarily stored in the program in step S1206 illustrated in FIG. 13. When the unified application determines that the printer object information does not exist (NO in step S1201), the processing is ended.

On the other hand, when unified application determines that the temporarily stored printer object information exists (YES in step S1201), in step S1202, the unified application acquires a name of the printer driver and a name of the output port of the printer object which are added, from the OS. Sequentially, in step S1203, the unified application acquires the name of the printer driver and the name of the output port of the printer object which are temporarily stored in the program of the unified application.

In step S1205, the unified application compares the name of the printer driver of the added printer object with the name of the temporarily stored printer object, and also compares the name of the output port of the added printer object with the name of the temporarily stored printer object. When it is determined that the names of the printer drivers do not correspond to each other, and further, when the names of the output ports do not correspond to each other (NO in step S1205), the processing is ended.

On the other hand, when it is determined that the names of the printer drivers correspond to each other, and further, when the names of the output ports correspond to each other (YES in step S1205), a message asking whether to register the added printer object as the printer icon is displayed. More specifically, the unified application detects the change of the name of the printer that has the same type of printer port and driver, and is probably controlled by the unified application. Sequentially, upon receiving a selection instruction from the user, in step S1207, the unified application determines whether to perform the registration.

When the unified application determines to perform the registration (YES in step S1207), in step S1208, the unified application adds the added printer object as the printer icon, and then the processing is ended. On the other hand, the unified application does not perform the registration, the processing is ended without registering the printer icon.

When the unified application is activated, a list of the printer objects currently managed by the unified application may be compared with a list of the printer objects managed by the OS. From among the names of the printer objects managed by the unified application, a name that is not included in the printer names of the printer objects managed by the OS is detected.

The unified application searches for a printer object that is managed by the OS and has a driver name and a port name corresponding to the printer name which corresponds to the printer object managed by the unified application. When the unified application finds the printer object, the unified application alerts the user that the printer name corresponding to the printer object of the OS has been changed.

In response to an approval instruction from the user, the printer icon may be registered by copying a value (including the printer name) of a data structure of the printer object that corresponds to the printer icon in the OS and whose name has been changed to a value (including the printer name) of a data structure of the printer object managed by the unified application.

As described above, the information processing apparatus 100 is mounted with the unified application as an example of the information processing apparatus. With this information processing apparatus 100, the user selects the icon of the document data and drops the icon onto the printer icon 402, which is an example of the device icon corresponding to the complex machine 102. The complex machine 102 is an example of the image forming apparatus which performs the image forming processing (e.g., printing). The unified application is an example of applications. In the present exemplary embodiment, examples of printers and complex machines are described. However, the present invention can also be applied to the image forming apparatuses and peripheral devices such as fax machines and scanners.

The unified application acquires the printer driver, which is an example of the device drivers managed by the OS in the information processing apparatus 100, and the printer object to be associated with the printer port.

The print object is an example of the device objects. The unified application determines whether a function which the printer driver corresponding to the printer object driver has, satisfies a condition for registering the printer icon of the unified application.

When the unified application determines that the condition is suitable for registering the printer icon, the unified application registers the printer icon 603 corresponding to the printer objects 605 and 606.

Further, the unified application may call up the printer driver SDK 601 of the device driver to check whether the printer driver includes a predetermined interface. Depending on the result, the unified application may determine whether the function of the printer object corresponding to the device driver satisfies the condition for registering the printer icon of the unified application.

Depending on whether the printer driver is a type of a predetermined version, the unified application may determine whether the function of the printer object corresponding to the device driver satisfies the condition for registering the printer icon of the unified application.

As described in FIG. 12, when the name of the printer icon that corresponds to the printer object and is managed by the OS is changed, the device name set for the printer icon registered on the unified application may be changed to correspond to the changed name of the printer icon.

In response to the detection of the periodical events from the OS or the activation of the unified application, the unified application may change the name of the printer icon. According to the present invention, an operability of the image forming apparatus can be improved.

According to another aspect of the present invention, when a printer is registered on the image processing apparatus as a printer whose image forming apparatus is managed by an application, a suitable image forming apparatus can be selected and registered.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). The program may be carried on a carrier medium such as a computer readable storage medium or a transmission medium (signal).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-172921 filed Jul. 24, 2009, which is hereby incorporated by reference herein in its entirety.

What is claimed is:

1. An information processing apparatus including an application, when a user selects an icon of document data and drops the icon onto a device icon corresponding to an image forming apparatus to cause the image forming apparatus to perform image forming processing, the information processing apparatus comprising:

an acquisition unit configured to acquire a device object which is corresponding to a device driver and managed by an operating system of the information processing apparatus;

a determination unit configured to determine whether a function of the device driver which is corresponding to the device object satisfies a condition of the application for registration of the device icon which is corresponding to the device object; and a registration unit configured to, when the determination unit determines that the function satisfies the condition for registering the device icon, register the device icon which is corresponding to the device object to the application, wherein the device driver and the device object are corresponding to the image forming apparatus, wherein when a software development kit (SDK) program of the device driver includes a predetermined interface, the determination unit determines that the function of the device driver which is corresponding to the device object satisfies the condition for registering the device icon of the application.

2. The information processing apparatus to claim 1, wherein, depending on whether the device driver is a type of a predetermined version, the determination unit determines whether the function of the device driver, which is corresponding to the device object satisfies the condition for registering the device icon of the application.

3. The information processing apparatus according to claim 1, further comprising a changing unit configured to, when a name of the device icon is changed, change a device name set for the device icon registered on the application to a name which agrees with a changed name of the device icon.

4. The information processing apparatus according to claim 3, wherein, in response to detection of a periodical event from the OS or an activation of the application, the changing unit performs changing processing on the device name.

5. A method for controlling an information processing apparatus including an application in which a user selects an icon of document data and drops the icon onto a device icon corresponding to an image forming apparatus to cause the image forming apparatus to perform image forming processing, the control method comprising:

acquiring a device object which is corresponding to a device driver and managed by an OS of the information processing apparatus;

determining whether a function of the device driver which is corresponding to the device object satisfies a condition of the application for registering the device icon, which is corresponding to the device object; and registering, by the application the, device icon which is corresponding to the device object to the application, when he determination unit determines that the function satisfies the condition for registering the device icon, wherein the device driver and the device object are corresponding to the image forming apparatus, and wherein when a software development kit (SDK) program of the device driver includes a predetermined interface, the determining determines that the function of the device driver which is corresponding to the device object satisfies the condition for registering the device icon of the application.

6. The controlling method according to claim 5, wherein, depending on whether the device driver is a type of a predetermined version, it is determined whether the function of the device driver which is corresponding to the device object satisfies the condition for registering the device icon of the application is determined.

7. The controlling method according to claim 5, further comprising, when a name of the device icon that is managed by the OS and which is corresponding to the device object, is changed, a device name set for the device icon registered on the application is changed to a name which agrees with a changed name of the device icon.

8. The controlling method according to claim 7, wherein, in response to detection of a periodical event from the OS or an activation of the application, change processing is performed on the device name.

9. A non-transitory storage medium storing a program performed by an information processing apparatus including an application in which a user selects an icon of document data and drops the icon onto a device icon corresponding to an image forming apparatus to cause the image forming apparatus to perform image forming processing, the program comprising:

acquiring a device object which is corresponding to a device driver and managed by an OS of the information processing apparatus;

determining whether a function of the device driver which is corresponding to the device object satisfies a condition of the application for registering the device icon, which is corresponding to the device object; and registering by the application the device icon which is corresponding to the device object to the application, when the determination unit determines that the function satisfies the condition for registering the device icon, wherein the device driver and the device object are corresponding to the image forming apparatus, and wherein when a software development kit (SDK) program of the device driver includes a predetermined interface, the determining determines that the function of the device driver which is corresponding to the device object satisfies the condition for registering the device icon of the application.

10. The non-transitory storage medium according to claim 9, wherein, depending on whether the device driver is a type of a predetermined version, it is determined whether the function of the device driver which is corresponding to the device object satisfies the condition for registering the device icon of the application.

11. The non-transitory storage medium according to claim 9, further comprising, when a name of the device icon that is managed by the OS and which is corresponding to the device object is changed, a device name set for the device icon registered on the application is changed to a name which agrees with a changed name of the device icon.

12. The non-transitory storage medium according to claim 11, wherein, in response to detection of a periodical event from the OS or an activation of the application, change processing is performed on the device name.

* * * * *